(12) United States Patent
Hayashikoshi et al.

(10) Patent No.: US 10,841,893 B2
(45) Date of Patent: Nov. 17, 2020

(54) POSITION ESTIMATION SYSTEM AND POSITION ESTIMATION METHOD

(71) Applicant: Murata Manufacturing Co., Ltd., Kyoto (JP)

(72) Inventors: Kenji Hayashikoshi, Kyoto (JP); Atsuto Komoda, Kyoto (JP); Shinya Harada, Kyoto (JP); Nobumitsu Amachi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/418,449

(22) Filed: May 21, 2019

(65) Prior Publication Data

US 2019/0274116 A1    Sep. 5, 2019

Related U.S. Application Data

(63) Continuation of application No. PCT/JP2017/046434, filed on Dec. 25, 2017.

(30) Foreign Application Priority Data

Dec. 27, 2016 (JP) ................. 2016-254493

(51) Int. Cl.
*G01C 21/20* (2006.01)
*H04W 64/00* (2009.01)
(Continued)

(52) U.S. Cl.
CPC ........ *H04W 64/003* (2013.01); *G01C 21/206* (2013.01); *G01S 5/02* (2013.01);
(Continued)

(58) Field of Classification Search
CPC ....... H04W 64/003; H04W 64/00; G01S 5/02; G01S 11/06; G01S 5/14; G01C 21/206
See application file for complete search history.

(56) References Cited

U.S. PATENT DOCUMENTS

2003/0017843 A1* 1/2003 Noblins .............. H04M 3/4228
455/553.1
2009/0073043 A1* 3/2009 Nozaki ................. G01S 5/0081
342/450
(Continued)

FOREIGN PATENT DOCUMENTS

JP   H02-44929 A    2/1990
JP   H08204421 A    8/1996
(Continued)

OTHER PUBLICATIONS

International Search Report for International Application No. PCT/JP2017/046434 dated Jan. 30, 2018.
(Continued)

*Primary Examiner* — Joseph E Dean, Jr.
(74) *Attorney, Agent, or Firm* — Pearne & Gordon LLP

(57) ABSTRACT

A position estimation system (11) includes: a plurality of fixed stations (100a-100d) installed inside a building, the plurality of fixed stations (100a-100d) each measuring the signal strength of a radio signal transmitted from a mobile object (300); and a calculator configured to estimate a position of the mobile object (300) based on the signal strengths measured at the plurality of fixed stations (100a-100d), wherein each of the plurality of fixed stations (100a-100d) is installed in such a position that a distance to a top part of the mobile object (300) is equal to or less than a predetermined distance when the mobile object (300) is directly below the fixed station (100a-100d).

21 Claims, 7 Drawing Sheets

(51) Int. Cl.
*G01S 5/14* (2006.01)
*G01S 11/06* (2006.01)
*G01S 5/02* (2010.01)

(52) U.S. Cl.
CPC ............... *G01S 5/14* (2013.01); *G01S 11/06* (2013.01); *H04W 64/00* (2013.01)

(56) References Cited

U.S. PATENT DOCUMENTS

| | | | |
|---|---|---|---|
| 2010/0245076 A1* | 9/2010 | Jo | ........................ G01C 21/206 |
| | | | 340/539.1 |
| 2016/0377697 A1* | 12/2016 | Sella | ..................... G01S 5/0294 |
| | | | 342/451 |
| 2018/0079085 A1* | 3/2018 | Nakata | ................... G05D 1/024 |

FOREIGN PATENT DOCUMENTS

| | | |
|---|---|---|
| JP | 3020516 B2 | 3/2000 |
| JP | 2005-210656 A | 8/2005 |
| JP | 2008-224489 A | 9/2008 |
| JP | 3170-000021 U | 9/2011 |
| JP | 2014-52196 A | 3/2014 |
| JP | 2015-21844 A | 2/2015 |
| JP | 2015-106814 A | 6/2015 |
| JP | 2015-232505 A | 12/2015 |
| WO | 2009/121738 A2 | 10/2009 |

OTHER PUBLICATIONS

Opinion for International Application No. PCT/JP2017/046434 dated Jan. 30, 2018.
Decision of Refusal for Japanese Patent Application No. 2018-559458 dated Sep. 1, 2020.

* cited by examiner

POSITION ESTIMATION SYSTEM AND POSITION ESTIMATION METHOD

This is a continuation of International Application No. PCT/JP2017/046434 filed on Dec. 25, 2017 which claims priority from Japanese Patent Application No. 2016-254493 filed on Dec. 27, 2016. The contents of these applications are incorporated herein by reference in their entireties.

BACKGROUND OF THE DISCLOSURE

Field of the Disclosure

The present disclosure relates to position estimation systems and position estimation methods and more particularly to a position estimation system and a position estimation method that enable stable estimation of the position of a mobile object.

Description of the Related Art

In general, various technologies relating to position estimation systems for estimating the position of a mobile object have been proposed (for example, patent documents 1 and 2).

The patent document 1 discloses a technology in which a mobile object receives radio waves from a plurality of base stations, obtains an area in which the mobile object may be present using a pre-obtained isoelectric field curve of received electric field level from each base station, and detects a position where the mobile object is from an overlapping part of the respective areas. The position detection in the patent document 1 is based on the principle of trilateration using the distance between the mobile object and each base station obtained from the received electric field level.

The patent document 2 discloses a technology in which a mobile object identifies an area where the mobile object is by receiving, at the mobile object, a radio wave transmitted from a radio-wave transmitter (marker) installed in each area. In the patent document 2, by providing a shielding body for limiting the radiation of a radio wave to be transmitted from the radio-wave transmitter into a certain direction, the radio-wave transmitter transmits the radio wave with a predetermined directional characteristic (for example, toward a floor from the radio-wave transmitter installed in a ceiling). This enables the radio-wave transmitter to radiate a radio wave into a desired area at low power consumption and alleviates inconvenience such that the mobile object erroneously receives a radio wave from an adjacent area.

Patent Document 1: Japanese Unexamined Patent Application Publication No. 2-44929
Patent Document 2: Japanese Unexamined Patent Application Publication No. 2015-106814

BRIEF SUMMARY OF THE DISCLOSURE

The inventors of the present disclosure have been studying a position estimation system including a plurality of fixed stations installed inside a building and a server to be connected to the plurality of fixed stations via a network. In this position estimation system, the fixed station receives a radio wave from a mobile object and measures the signal strength of the received signal, and the server estimates the position of the mobile object based on the measured signal strength.

However, the position estimation system configured in this way sometimes cannot perform highly accurate position estimation of the mobile object due to, for example, an influence of multipathing and the like.

In view of the above, an object of the present disclosure is to provide a position estimation system that includes a plurality of fixed stations installed inside a building and a server connected to the plurality of fixed stations via a wireless network and enables a highly accurate position estimation of a mobile object.

In order to achieve the above-described object, a position estimation system according to one aspect of the present disclosure includes: a plurality of fixed stations installed inside a building, the plurality of fixed stations each measuring the signal strength of a radio signal transmitted from a mobile object; and a calculator configured to estimate a position of the mobile object based on the signal strengths measured at the plurality of fixed stations, wherein each of the plurality of fixed stations is installed in such a position that a distance to a top part of the mobile object is equal to or less than a predetermined distance when the mobile object is directly below the fixed station.

This configuration allows the mobile object and the fixed station to be in proximity to each other in such an extent that the distance therebetween is equal to or less than the predetermined distance when the mobile object is directly below the fixed station, thereby enabling highly accurate estimation particularly of the position of the mobile object directly below the fixed station.

The predetermined distance is determined, for example, based on the simulation of the signal strength in a multipath environment defined by the frequency of a radio signal and the size of the internal space inside the building. Specifically, the predetermined distance may be set at the upper limit of a distance range within which the correspondence accuracy between the signal strength and the distance is not largely damaged by the influence of multipathing.

Further, of the plurality of fixed stations, at least one fixed station may be attached to at least one of a ceiling, a wall, a piece of furniture, and a piece of equipment in the building with an insulating spacer interposed therebetween.

According to this configuration, the fixed station is installed on the ceiling, the wall, the piece of furniture, or the piece of equipment in the building with the spacer interposed therebetween so as to be separated from each other. Thus, the influences of the ceiling, the wall, the piece of furniture, and the piece of equipment are reduced, and the receiving characteristics become close to non-directional. This causes the correspondence between the signal strength and the distance to become more equal in all-around directions, thereby stabilizing the estimation accuracy of the position of the mobile object. Further, providing good visibility between the fixed stations enables direct and stable communications between the fixed stations, thereby simplifying the system configuration.

Further, of the plurality of fixed stations, at least one fixed station may be installed together with a piece of equipment to be used by the mobile object and installed above a position where the mobile object is when the mobile object uses the piece of equipment.

This configuration enables to estimate the presence of the mobile object (worker or moving device) at a point of interest, which is a position to be in when a certain piece of equipment is used, with particularly high accuracy. Here, the equipment is not limited to mechanical devices, but may include furniture such as a rack, a locker, and the like, and structures such as a doorway, a stair, and the like.

Further, when there is the fixed station at which a signal strength larger than a threshold value is measured, the calculator may estimate that the mobile object is directly below that fixed station, and when there is no fixed station at which a signal strength larger than the threshold value is measured, the calculator may estimate the position of the mobile object using distances between the plurality of fixed stations and the mobile object, the distances being obtained from the signal strengths respectively measured at the plurality of fixed stations.

This configuration enables to estimate the presence of the mobile object directly below the fixed station with high accuracy with a small computational load by comparing the signal strength measured at the fixed station with the threshold value. On the other hand, in the case where it cannot be estimated that the mobile object is directly below any of the plurality of fixed stations, the position of the mobile object can be estimated using the distances obtained from the signal strengths respectively measured at the plurality of the fixed stations in accordance with, for example, the principle of general trilateration.

Further, the position estimation system may further include a transmitter configured to transmit the radio signal and installed in a top part of the mobile object at a position where an upward radio wave passes through.

According to this configuration, the downward radiation of the radio signal from the transmitter is blocked by the mobile object itself, multipathing caused by floor reflection is reduced, and the received signal strength at the fixed station is stabilized. Further, because a radio signal radiated in the horizontal direction from the transmitter is less likely to be blocked by the mobile object itself, the receiving characteristics in a horizontal plane become closer to non-directional. This causes the correspondence between the signal strength and the distance to become more equal in all-around directions, thereby stabilizing the estimation accuracy of the position of the mobile object. Further, the radio signal radiated upward from the transmitter reaches the fixed station after passing through the mobile object. This enables to hold down the output power of the transmitter and extend the battery lifetime by reducing the power consumption.

Further, the position estimation system may further include a radio-wave absorption member configured to reduce the downward radiation of the radio signal and placed on the mobile object.

According to this configuration, the downward radiation of the radio signal from the transmitter is blocked by the radio-wave absorption member, and multipathing caused by floor reflection is effectively reduced. As a result, the stability of the received signal strength at the fixed station increases, and the position of the mobile object can be estimated with still higher accuracy.

Further, the radio signal may be transmitted at a plurality of frequencies, the fixed station may measure the signal strength of the radio signal at each of the plurality of frequencies, and the calculator may estimate the position of the mobile object using the signal strengths at the plurality of frequencies.

This configuration enables the robust position estimation compared with the case where a single frequency is used. Further, even in the case where the received signal strength of a radio signal at a certain frequency decreases considerably due to multipathing (so-called NULL occurs), the fixed station can still receive the radio signal at another frequency. This enables to avoid the situation where the fixed station receives no radio signal from the mobile object.

Further, each of the plurality of fixed stations may notify the calculator of the signal strength using a radio signal of the same system as that of the radio signal with which the signal strength is to be measured.

According to this configuration, because measuring the signal strength and notifying the calculator of the measured signal strength are performed using the radio signals of the same system. Thus, only one communication device is needed in the fixed station, thereby enabling to hold down the cost of the fixed station.

Further, a position estimation method according to one aspect of the present disclosure includes: measuring the signal strength of a radio signal transmitted from a mobile object at a plurality of fixed stations, the plurality of fixed stations each being installed in such a position that a distance to a top part of the mobile object is equal to or less than a predetermined distance when the mobile object is directly below the fixed station; and estimating a position of the mobile object based on the signal strength measured by at least one fixed station of the plurality of fixed stations.

This method allows the mobile object and the fixed station to be in proximity to each other in such an extent that the distance therebetween is equal to or less than the predetermined distance when the mobile object is directly below the fixed station, thereby particularly enabling the highly accurate estimation of the position of the mobile object directly below the fixed station.

The predetermined distance is determined, for example, based on simulation of the signal strength in a multipath environment defined by the frequency of a radio signal and the size of internal space inside a building. Specifically, the predetermined distance may be set at the upper limit of a distance range within which the correspondence accuracy between the signal strength and the distance is not largely damaged by the influence of multipathing.

Further, when there is the fixed station at which a signal strength larger than a threshold value is measured, the mobile object may be estimated to be directly below that fixed station, and when there is no fixed station at which a signal strength larger than the threshold value is measured, the position of the mobile object may be estimated using distances between the plurality of fixed stations and the mobile object, the distances being obtained from the signal strengths measured at the plurality of fixed stations.

This method enables to estimate the presence of the mobile object directly below the fixed station with high accuracy with a small computational load by comparing the signal strength measured at the fixed station with the threshold value. On the other hand, in the case where it cannot be estimated that the mobile object is directly below any of the plurality of fixed stations, the position of the mobile object can be estimated using the distances obtained from the signal strengths respectively measured at the plurality of the fixed stations in accordance with, for example, the principle of general trilateration.

According to the position estimation system and the position estimation method of the present disclosure, the position estimation system and the position estimation method that enable a highly accurate position estimation of a mobile object are provided.

BRIEF DESCRIPTION OF THE SEVERAL
VIEWS OF THE DRAWINGS

DETAILED DESCRIPTION OF THE DISCLOSURE (Underlying Knowledge Forming Basis of the Present disclosure)

The inventors of the present disclosure found that the position estimation systems described in the section of Background Art have an issue described below. In the following section, after the issue is described with reference to a general position estimation system, characteristic configurations and advantageous effects of a position estimation system according to an embodiment of the present disclosure are described.

Figure 1:
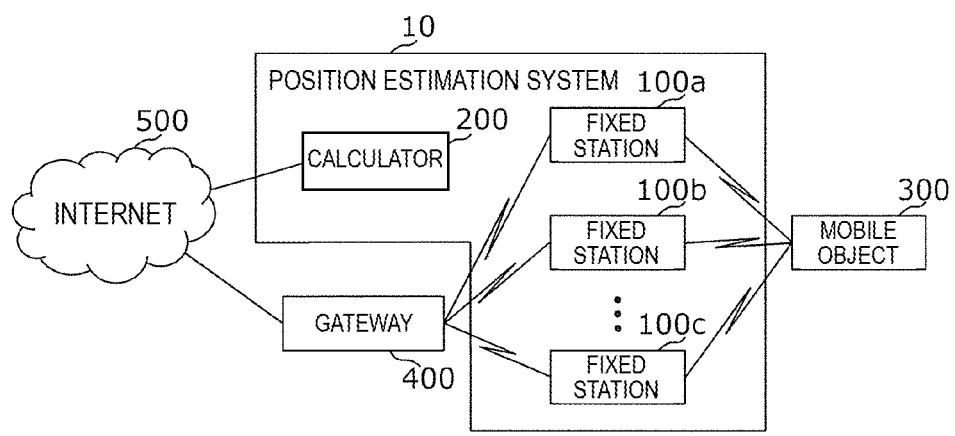
FIG. 1 is a functional block diagram illustrating an example of a configuration of a general position estimation system.

FIG. 1 is a functional block diagram illustrating an example of a configuration of a general position estimation system. As illustrated in FIG. 1, a position estimation system 10 includes fixed stations 100a, 100b, and 100c and a calculator 200. The fixed stations 100a, 100b, and 100c are communicably connected to the calculator 200 via a gateway 400 and the internet 500.

Each of the fixed stations 100a, 100b, and 100c is a wireless communication device that measures the received signal strength of a radio signal transmitted from a mobile object 300 and notifies the calculator 200 of data indicating the measured received signal strength. The received signal strength is typically represented by a received signal strength index (RSSI) value. The configurations of the fixed stations 100a, 100b, and 100c will be described in detail later.

The calculator 200 is a computer device that estimates the position of the mobile object 300 based on the RSSI values notified by the fixed stations 100a, 100b, and 100c. The calculator 200 estimates the position of the mobile object 300 by the principle of trilateration using the distances from the fixed stations 100a, 100b, and 100c to the mobile object 300 that are obtained from the RSSI values respectively notified by the fixed stations 100a, 100b, and 100c. Specifically, the calculator 200 may be realized by a personal computer (PC) or an application server on the internet.

In the following part, a radio signal transmitted from the mobile object 300 is referred to as a "RSSI measuring signal", and a radio signal transmitted from each of the fixed stations 100a, 100b, and 100c to the calculator 200 is referred to as a "RSSI notifying signal".

Figure 2:
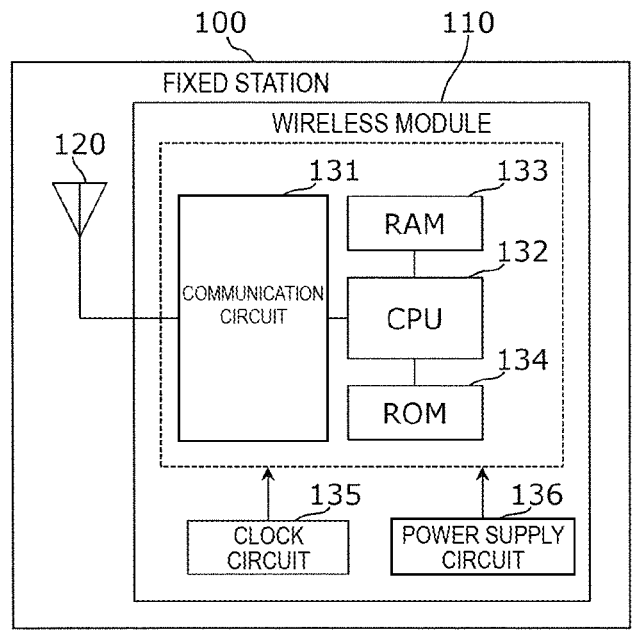
FIG. 2 is a functional block diagram illustrating an example of a configuration of a general fixed station.

FIG. 2 is a functional block diagram illustrating an example of the configuration of a fixed station 100. In FIG. 2, a common configuration of the fixed stations 100a, 100b, and 100c is referred to as the fixed station 100 and described.

As illustrated in FIG. 2, the fixed station 100 includes a wireless module 110 and an antenna 120.

The wireless module 110 includes a communication circuit 131, a central processing unit (CPU) 132, a random-access memory (RAM) 133, a read-only memory (ROM) 134, a clock circuit 135, and a power supply circuit 136.

In ROM 134, a control program to be executed by the CPU 132 is written. In ROM 134, an identification (ID) for uniquely identifying the fixed station 100 in a network may be written. The RAM 133 is a work space for the operation of the control program.

The communication circuit 131 is an electronic circuit for performing the wireless communications between the fixed stations 100, between the fixed station 100 and the mobile object 300, and between the fixed station 100 and the gateway 400. The communication circuit 131 transmits and receives the radio signals using the antenna 120. The radio signals include a RSSI measuring signal and a RSSI notifying signal.

The clock circuit 135 and the power supply circuit 136 generate a clock signal and a power supply voltage to be used for the operation of the wireless module 110 and supply the clock signal and the power supply voltage to the communication circuit 131, the CPU 132, the RAM 133, and the ROM 134.

By running the control program written in the ROM 134 on the CPU 132, the wireless module 110 performs a first operation of receiving a RSSI measuring signal and calculating a RSSI value and a second operation of transmitting a RSSI notifying signal indicating the calculated RSSI value. The wireless module 110 may form a multihop network in which a plurality of fixed stations 100 and the gateway 400 are connected to each other prior to the first operation and the second operation.

The fixed station 100 is operated by electric power supplied from a battery or a power line inside a building, which is not illustrated.

In the position estimation inside the building, it is sufficient for a radio signal for measurement to have a range of about several tens of meters. Accordingly, as the RSSI measuring signal, a low power-consumption radio system such as, for example, Bluetooth (registered trademark) low energy (BLE) or the like can be used.

In the case where BLE is used, the system can be simplified by allowing the mobile object 300 to broadcast-transmit the RSSI measuring signal in advertising channels of BLE. In advertising channels of BLE, three frequencies, 2402 MHz, 2426 MHz, and 2480 MHz are available.

The inventors of the present disclosure checked the relationship between the distance and the RSSI value of the RSSI measuring signal at the frequencies of the advertising channels of BLE by simulation.

Figure 3:
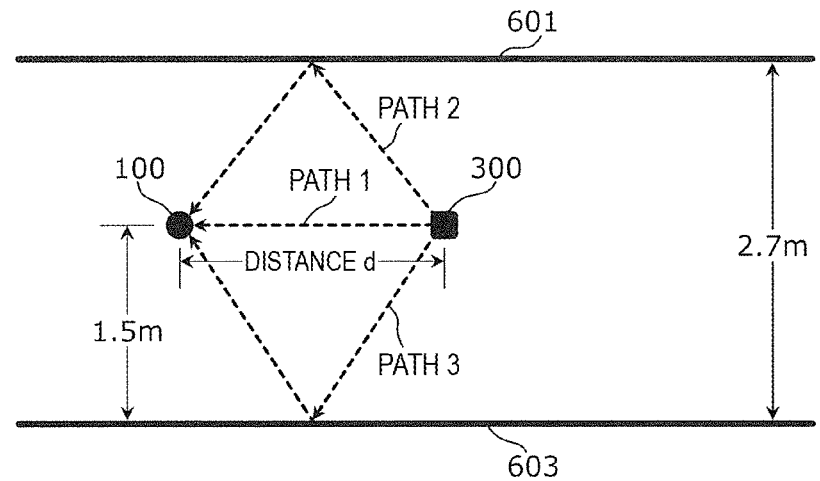
FIG. 3 is a diagram illustrating an example of a simulation condition of the received signal strength of a radio signal.

FIG. 3 is a diagram illustrating an example of a simulation condition of the RSSI value of the RSSI measuring signal. In the example of FIG. 3, in a 2.7-m-high wide space having a ceiling 601 and a floor 603, but having no wall, the fixed station 100 and the mobile object 300 are positioned at a height of 1.5 m from the floor 603. According to such arrangement, a multipath is formed for a radio signal from the mobile object 300 to the fixed station 100 due to the reflections from the ceiling 601 and the floor 603.

Under the simulation condition of FIG. 3, for each of the three frequencies of the advertising channels of BLE, the RSSI value of a radio signal transmitted from the mobile object 300 is evaluated at the fixed station 100 that is separated by the distance d.

Figure 4:
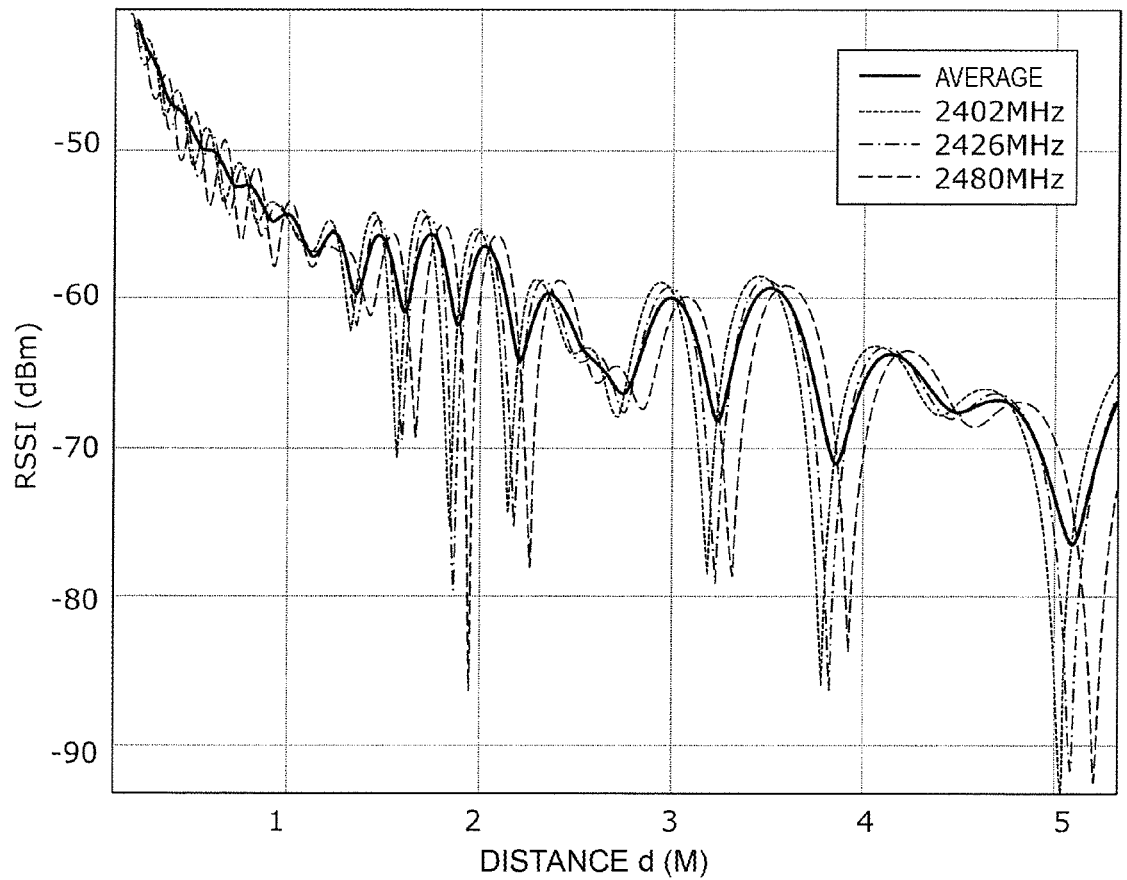
FIG. 4 is a diagram illustrating an example of a simulation result of the received signal strength of a radio signal.

FIG. 4 is a diagram illustrating an example of a simulation result. According to FIG. 4, when the mobile object 300 and the fixed station 100 are separated by 1 m or more, NULLs (points where the RSSI value decreases considerably) that differ from frequency to frequency appear due to the influence of multipathing. Accordingly, in the case where the frequency of the advertising channel of BLE is used, the upper limit of a distance range within which correspondence accuracy between the RSSI value and the distance is not largely damaged by NULL is, for example, 1 m.

Note that, for example, by rotating FIG. 3 by 90 degrees, the simulation condition of FIG. 3 may be deemed to be that of the case where the fixed station 100 and the mobile object 300 are installed by separating in an up-and-down direction between two walls. Accordingly, the upper limit described above is effective not only in a horizontal direction but also in the up-and-down direction.

Because of this, it can be said that, in order to detect the mobile object 300 located at a point of interest with particularly high accuracy, it is effective to place the fixed station 100 in such a position that the distance to the mobile object 300 located at the point of interest is equal to or less than a predetermined distance (the upper limit described above or, for example, 1 m).

Based on the study such as this, the inventors of the present disclosure invent a position estimation system and a position estimation method that enable a highly accurate position estimation of a mobile object.

Hereinafter, embodiments of the present disclosure will be described in detail using the drawings. Note that embodiments which will be described below each illustrate a comprehensive or specific example. Numeric values, shapes, materials, constituting elements, arrangements and connection modes of the constituting elements, steps, sequences of the steps, and the like described in the following embodiments are mere examples, and not intended to limit the present disclosure. Of constituting elements in the following embodiments, constituting elements that are not described in an independent claim will be described as optional constituting elements. Further, the sizes of constituting elements illustrated in the drawings or ratios of their sizes may not be precise.

Embodiment 1

A position estimation system according to embodiment 1 includes a plurality of fixed stations installed inside a building and a calculator communicably connected to the plurality of fixed stations, wherein the fixed station receives a radio signal from a mobile object and measures a signal strength thereof, and the calculator estimates the position of the mobile object based on the measured signal strength. The position estimation system is characterized in that each of the plurality of fixed stations is installed in such a position that the distance to a top part of the mobile object positioned directly below the fixed station is equal to or less than a predetermined distance.

Note that, in the present specification, "directly below the fixed station" may also be defined simply as "vertically down below the fixed station". Alternatively, using the above-described upper limit of the distance range within which the correspondence accuracy between the RSSI value and the distance is not largely damaged by NULL, "directly below the fixed station" may be defined as "inside a horizontal circle centered at vertically down below the fixed station with a radius smaller than the upper limit".

Figure 5:
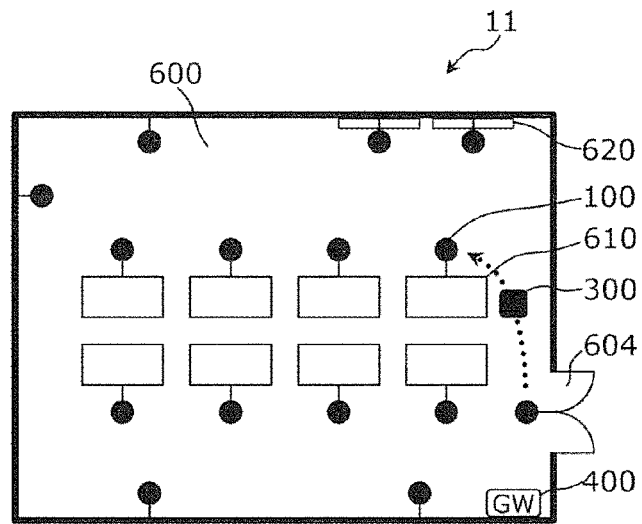
FIG. 5 is a plan view illustrating an installation example of a position estimation system according to embodiment 1.
Figure 6:
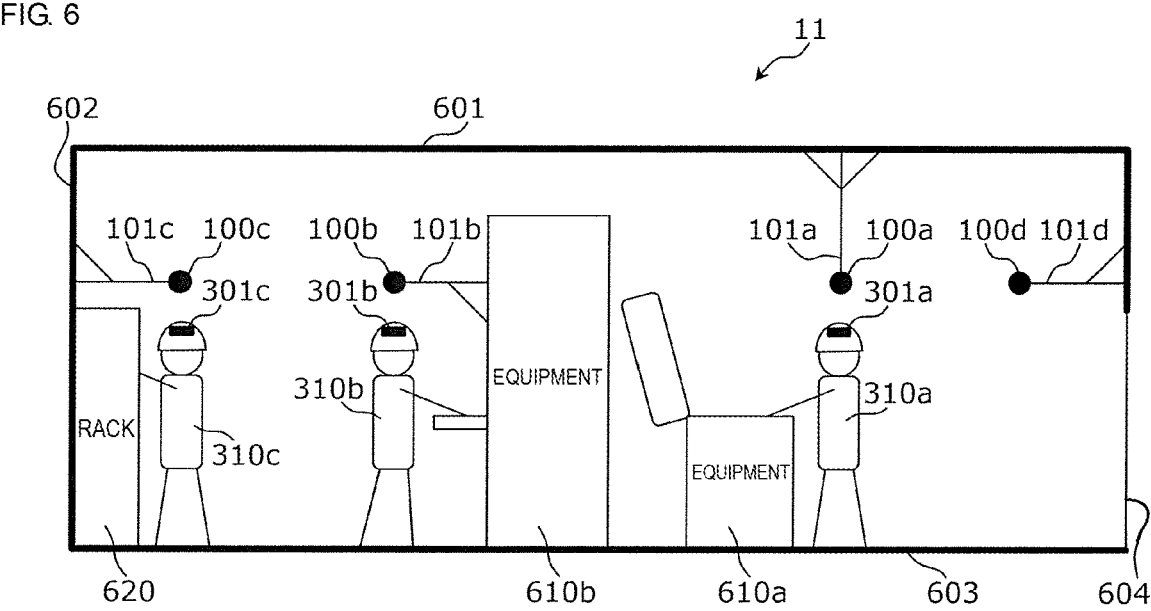
FIG. 6 is a side view illustrating an installation example of the position estimation system according to the embodiment 1.

FIG. 5 and FIG. 6 are a plan view and a side view illustrating an installation example of a position estimation system 11, respectively. The position estimation system 11 is a specific example of the position estimation system 10 of FIG. 1.

FIG. 5 and FIG. 6 illustrate an example of the position estimation system 11 installed in a work floor 600 of a factory. In FIG. 6, an alphabetical character attached to the end of a reference code draws a distinction between individual constituting elements of the same kind.

The work floor 600 is an indoor space surrounded by a ceiling 601, a wall 602, and a floor 603, and is provided with a doorway 604. In the work floor 600, pieces of equipment 610 (for example, machine tools) and racks 620 (for example, tool racks) are installed together with the fixed station 100 and the gateway 400 described in FIG. 1. Further, although it is not illustrated in FIG. 5 and FIG. 6, the gateway 400 is connected to the calculator 200 via the internet 500.

In FIG. 6, as examples of the mobile objects 300, workers 310a, 310b, and 310c are illustrated. The workers 310a, 310b, and 310c move inside the work floor 600 and carry out the given tasks. Inside the top parts of the hard hats worn by the workers 310a, 310b, and 310c, transmitters 301a, 301b, and 301c for transmitting the RSSI measuring signal are installed. In the case where the hard hat is made of a radio-wave transmitting material such as fiber reinforced plastic (FRP) and the like, the inside of the top part of the hard hat is an example of the position of the top part of the mobile object 300, where an upward radio wave passes through.

Installation heights of the transmitters 301a, 301b, and 301c are dependent on the heights of the workers 310a, 310b, and 310c, and are generally in the range of about 1.5 m to 1.9 m or about 40 cm. Installation positions of the transmitters 301a, 301b, and 301c are not limited to the inside of the top part of each hard hat, but may alternatively be placed on shoulders or the like. In this case, the installation heights of the transmitters 301a, 301b, and 301c are generally in the range of about 1.3 m to 1.7 m.

The fixed station 100a is attached to the ceiling 601 with an insulating spacer 101a interposed therebetween. The fixed station 100b is attached to a piece of equipment 610b with an insulating spacer 101b interposed therebetween. The fixed station 100c and 100d are attached to the walls 602 with insulating spacers 101c and 101d interposed therebetween, respectively. The spacers 101a to 101d may be, for example, vinyl chloride tubes. The fixed stations 100a to 100d may each receive the power for the operation through a power supply cable passed through the vinyl chloride tube.

Each of the fixed stations 100a to 100d is generally installed at a height of 2 m.

The fixed stations 100a and 100b are respectively installed together with the pieces of equipment 610a and 610b to be used by the workers 310a, 310b, and 310c, and installed above the positions where the workers 310a, 310b, and 310c are when the workers 310a, 310b, and 310c use the pieces of equipment 610a and 610b. That is, the fixed stations 100a and 100b are installed on such positions that the workers 310a, 310b, and 310c carrying out the given tasks using the pieces of equipment 610a and 610b are directly below the fixed stations 100a and 100b.

Furniture such as the rack 620 and the like and structures such as the doorway 604 and the like may be included in the equipment in a broad sense. The fixed stations 100c and 100d are respectively installed above the positions where the workers 310a, 310b, and 310c are when the workers 310a, 310b, and 310c use the rack 620 and the doorway 604. That is, the fixed stations 100c and 100d are installed on such positions that the workers 310a, 310b, and 310c who are taking goods out and in the rack 620 or walking through the doorway 604 are directly below the fixed stations 100c or 100d.

In the case where the spacers 101b, 101c, and 101d are extended horizontally from the piece of equipment 610b or the wall 602 in order to have such arrangement, the length of the spacer may be set, for example, at about 80 cm.

This allows the distances between the transmitters 301a, 301b, and 301c and the fixed station 100 to be generally 10 cm to 50 cm in a position where the worker is when the worker uses a piece of equipment (30 cm to 70 cm in the case where the transmitters 301a, 301b, and 301c are placed on shoulders of the workers). Further, even in the case where the worker sits down in front of a piece of equipment, the distances between the transmitters 301a, 301b, and 301c and the fixed station 100 are generally equal to or less than 1 m.

According to the position estimation system 11 configured as described above, the following advantageous effects are obtained.

The fixed station 100 is placed in such a position that the distance to the mobile object 300 is equal to or less than a predetermined distance when the mobile object 300 is directly below the fixed station 100. This allows the fixed station 100 and the mobile object 300, which is directly below the fixed station 100, to be in proximity to each other in such an extent that the distance therebetween is equal to or less than the predetermined distance, thereby particularly enabling the highly accurate estimation of the position of the mobile object 300 directly below the fixed station 100.

The predetermined distance is determined, for example, based on the simulation of the signal strength in a multipath environment defined by the frequency of a radio signal and the size of internal space inside the building. Specifically, the predetermined distance may be set at the upper limit of a distance range within which the correspondence accuracy between the RSSI value and the distance is not largely damaged by the influence of multipathing (in other words, no large NULL is included). In the case where the frequency of an advertising channel of BLE is used, the upper limit is, for example, 1 m (for example, see the simulation result of FIG. 4).

Further, the fixed station 100 is installed on the ceiling, the wall, a piece of furniture, or a piece of equipment in the building with the spacer 101 interposed therebetween so as to be separated from each other. Thus, the influences of the ceiling, the wall, the piece of furniture, and the piece of equipment are reduced, and the receiving characteristics become close to non-directional. This causes the correspondence between the signal strength and the distance to become more equal in all-around directions, thereby stabilizing the estimation accuracy of the position of the mobile object. Further, providing good visibility between the fixed stations 100 enables the direct and stable communication between the fixed stations 100, thereby simplifying the system configuration.

Further, each fixed station 100 is installed above the point of interest, which is the position of the mobile object 300 (for example, the worker 310a, 310b, 310c) when the mobile object 300 uses a certain piece of equipment. This enables to estimate the presence of the worker at the point of interest with particularly high accuracy.

Further, radio signals (for example, the RSSI measuring signals) are being transmitted from the transmitters 301a, 301b, and 301c installed in the top parts of the mobile objects 300 at positions where upward radio waves pass through. Accordingly, by blocking the downward radiation of the radio signal from the transmitter 301a, 301b, 301c with the mobile object 300 itself, multipathing caused by floor reflection is reduced, and the received signal strength at the fixed station 100 is stabilized. Further, because the radio signals radiated in a horizontal direction from the transmitters 301a, 301b, and 301c are less likely to be blocked by the mobile object 300 itself, the receiving characteristics in a horizontal plane become closer to non-directional. This causes the correspondence between the signal strength and the distance to become more equal in all-around directions, thereby stabilizing the estimation accuracy of the position of the mobile object 300. Further, the radio signals radiated upward from the transmitters 301a, 301b, and 301c reach the fixed stations 100 after passing through the mobile objects 300. This enables to hold down the output power of the transmitters 301a, 301b, and 301c and extend battery lifetime by reducing power consumption.

Next, the operation of the position estimation system 11 is described. Before describing the operation below, it is assumed that a multihop network, in which the fixed stations 100 and the gateway 400 in the work floor 600 are connected, is formed.

Figure 7:
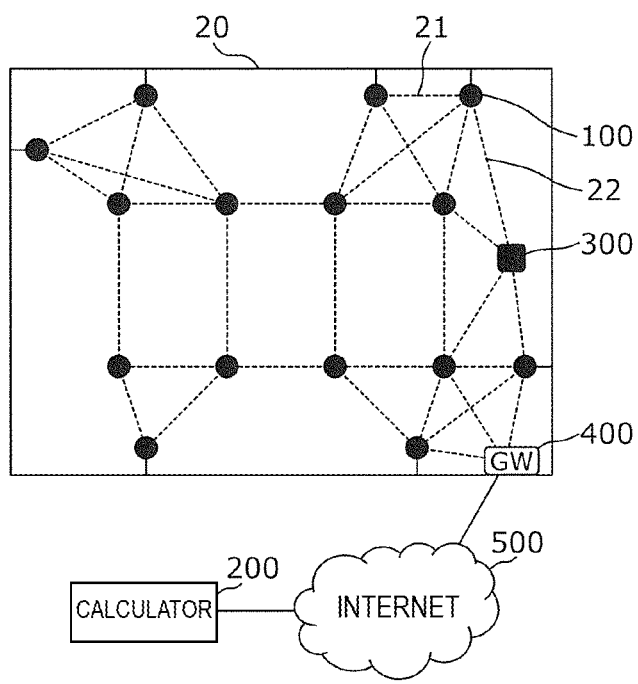
FIG. 7 is a plan view illustrating an example of a network configuration of the position estimation system according to the embodiment 1.

FIG. 7 is a diagram illustrating an example of a multihop network 20 in the work floor 600. The arrangement of the multihop network 20 of FIG. 7 corresponds to the installation example of the position estimation system 11 of FIG. 5. In FIG. 7, connections 21 and 22 between nodes are indicated by the dotted line. In the multihop network 20, the mobile object 300 may be connected, or the connection 22 between the fixed station 100 and the mobile object 300 may be set ad hoc. The gateway 400 is connected to the calculator 200 via the internet 500.

Figure 8:
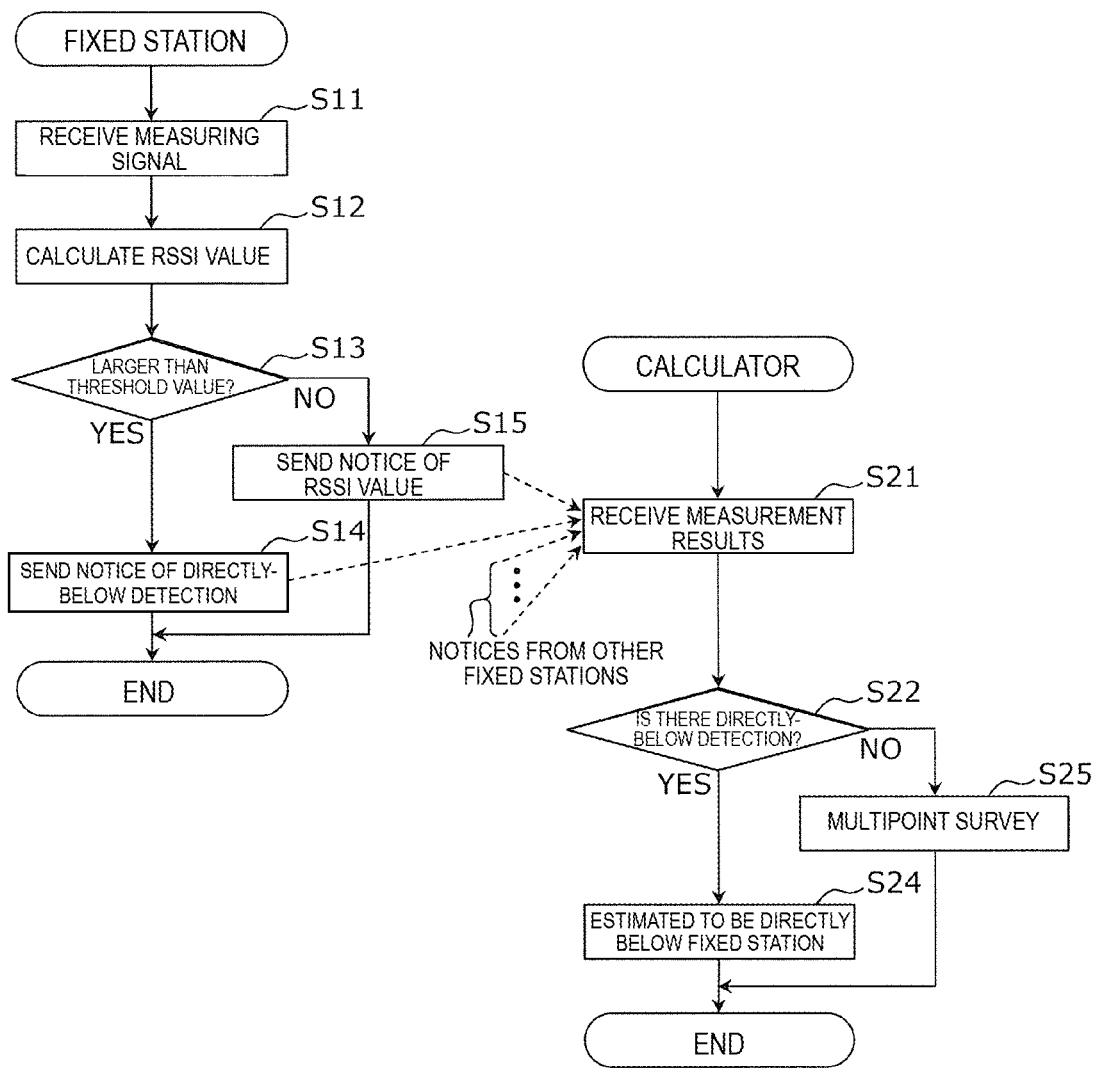
FIG. 8 is a flowchart illustrating an example of a position estimation method according to the embodiment 1.

FIG. 8 is a flowchart illustrating an example of a position estimation method to be implemented in the position estimation system 11.

The fixed station 100 receives a RSSI measuring signal transmitted from the mobile object 300 (S11) and calculates the RSSI value (S12). The mobile object 300 may transmit the RSSI measuring signal at a plurality of frequencies, and the plurality of frequencies may be, for example, two or more of the frequencies included in the advertising channels of BLE. In the case where the mobile object 300 transmits a RSSI measuring signal at a plurality of frequencies, the fixed station 100 may calculates, as the RSSI value of the RSSI measuring signal, a representative value (for example, average value, median value, maximum value, or the like) of the RSSI values for each frequency.

If the calculated RSSI value is equal to or larger than a threshold value (YES in S13), the fixed station 100 transmits, to the calculator 200, a RSSI notifying signal indicating the detection of the mobile object 300 directly below the fixed station 100 (S14). On the other hand, if the calculated RSSI value is not equal to or larger than the threshold value (NO in S13), the fixed station 100 transmits, to the calculator 200, a RSSI notifying signal indicating the calculated RSSI value (S15). The threshold value is, for example, −50 dBm.

The fixed station 100 may transmit the RSSI notifying signal by using BLE, which is the same wireless system as the RSSI measuring signal. For example, the RSSI notifying signal is forwarded to the gateway 400 through the multihop network 20 of FIG. 7, and then transmitted to the calculator 200 via the internet 500.

The calculator 200 receives the RSSI notifying signal indicating a directly-below detection or the RSSI value from one or more fixed stations 100 (S21).

If there is a notice of the directly-below detection from any of the fixed stations 100 (YES in S22), the position of the mobile object 300 is estimated as being directly below that fixed station 100 (S24). On the other hand, if there is no notice of the directly-below detection from any of the fixed stations 100 (NO in S22), a multipoint survey is carried out (S25). That is, the position of the mobile object 300 is estimated by the principle of trilateration using the distances from a plurality of the fixed stations 100 to the mobile object 300, which are obtained from the RSSI values respectively notified by the plurality of the fixed stations.

In this way, the position estimation system 11 estimates the position of the mobile object 300.

According to the position estimation method described above, the fixed station 100 is placed in such a position that the distance from the mobile object 300, which is directly below the fixed station 100, is equal to or less than the predetermined distance. This enables the fixed station 100 to estimate the presence of the mobile object 300 directly below with high accuracy. Because of this reason, the presence of the mobile object 300 directly below the fixed station 100 can be estimated highly accurately with a small computational load by comparing the RSSI value measured at the fixed station 100 with the threshold value.

On the other hand, in the case where it cannot be estimated that the mobile object 300 is directly below any of the plurality of fixed stations 100, the position of the mobile object 300 can be estimated using the distances obtained from the RSSI values respectively measured at the plurality of the fixed stations 100 in accordance with, for example, the principle of general trilateration.

Further, transmission of the RSSI measuring signal and measurement of the RSSI value are performed at a plurality of frequencies. This enables the robust position estimation compared with the case where a single frequency is used. Further, even in the case where the received signal strength of a radio signal at a certain frequency decreases considerably due to multipathing (so-called NULL occurs), the fixed station 100 can still receive the radio signal at another frequency. This enables to avoid the situation where no radio signal from the mobile object 300 reaches the fixed station 100.

Further, the radio signals of the same system are used for the RSSI measuring signal and the RSSI notifying signal. Accordingly, only one communication device is needed in the fixed station 100, thereby enabling to hold down the cost of the fixed station 100.

Figure 9:
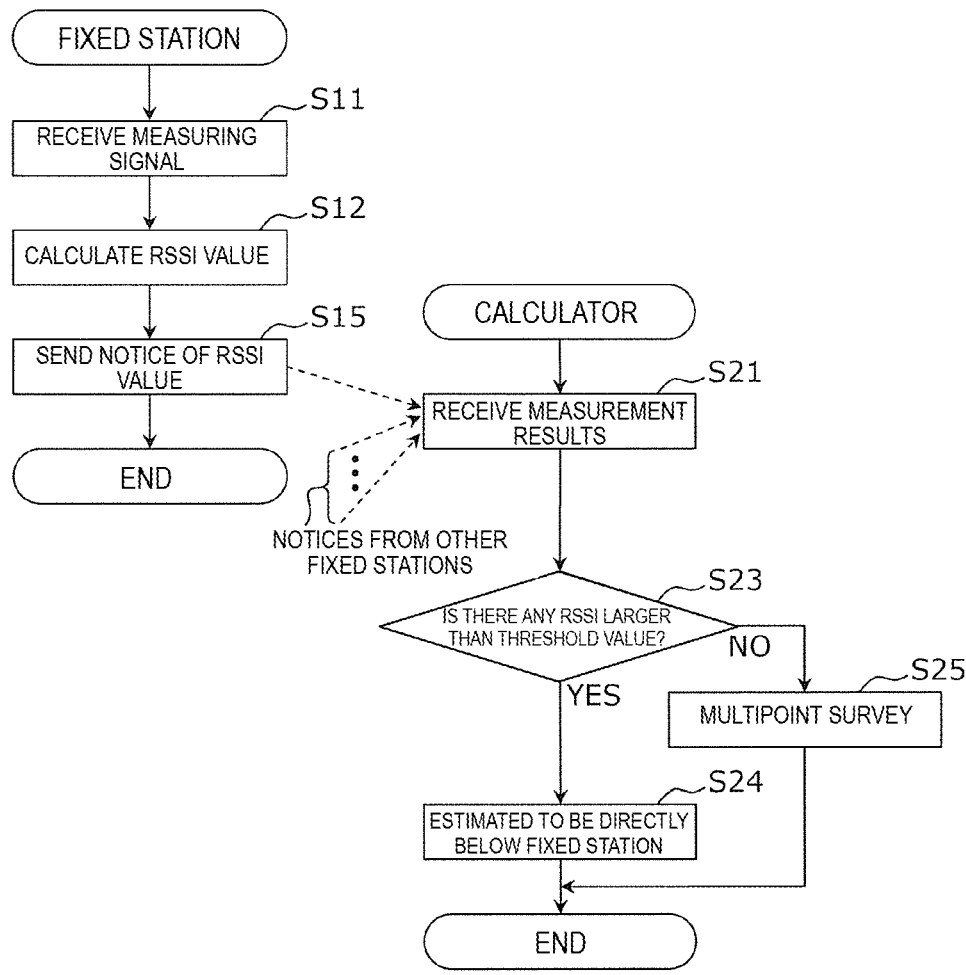
FIG. 9 is a flowchart illustrating another example of the position estimation method according to the embodiment 1.

FIG. 9 is a flowchart illustrating another example of the position estimation method to be implemented in the position estimation system 11.

Compared with FIG. 8, the operation of FIG. 9 is different in that, in the fixed station 100, the step of comparing the RSSI value with the threshold value (S13) and the step of notifying the directly-below detection (S14) are excluded, and the calculator 200 is always notified of the calculated RSSI value (S15). Further, the operation of FIG. 9 is different in that, in the calculator 200, the step of determining the presence or absence of the directly-below detection (S22) is replaced with the step of comparing the RSSI value notified by the fixed station with the threshold value (S23).

According to these differences, the operation of FIG. 9 simplifies the operation of the fixed station 100 and, in the calculator 200, facilitates the change in setting of the threshold value to be compared with the RSSI value.

Embodiment 2

In embodiment 2, another installation example of the position estimation system 10 is described.

Figure 10:
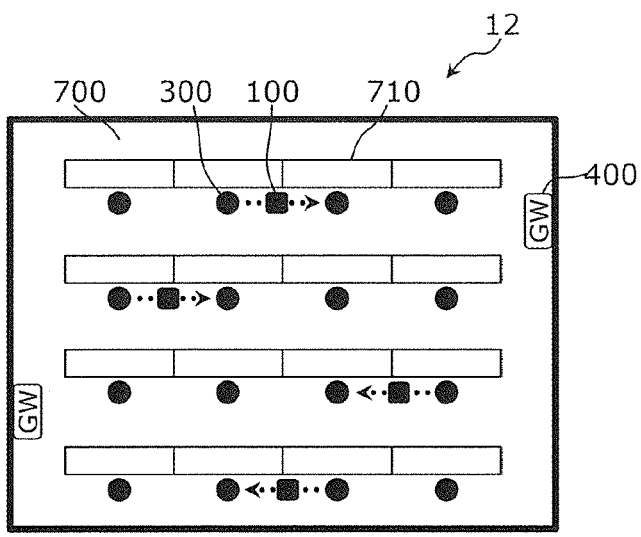
FIG. 10 is a plan view illustrating an installation example of a position estimation system according to embodiment 2.
Figure 11:
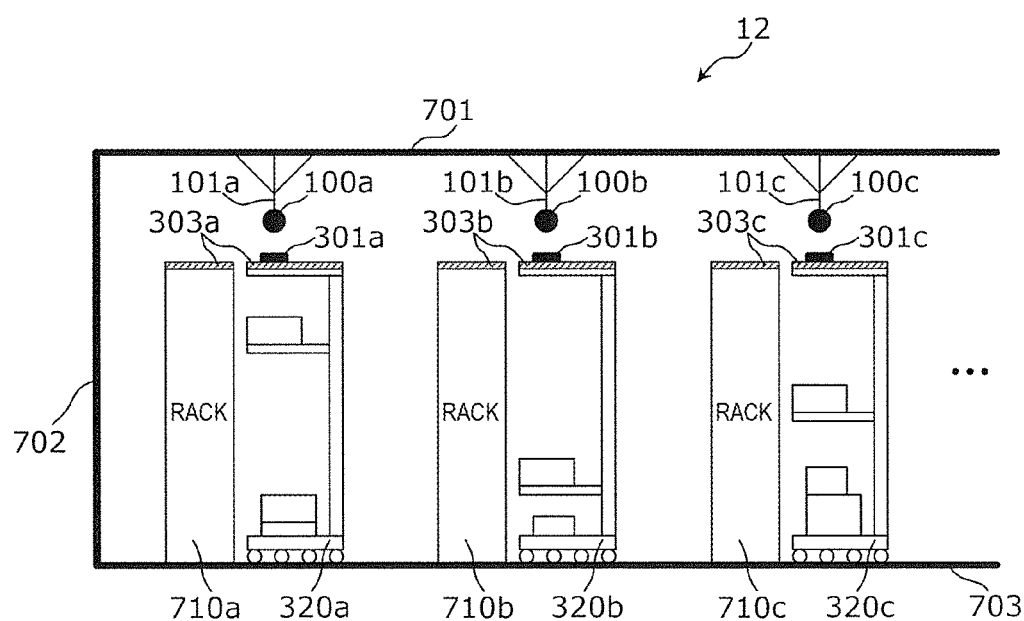
FIG. 11 is a side view illustrating an installation example of the position estimation system according to the embodiment 2.

FIG. 10 and FIG. 11 are a plan view and a side view illustrating another installation example of the position estimation system 10, respectively.

FIG. 10 and FIG. 11 illustrate examples of a position estimation system 12 installed in an automated warehouse 700. In FIG. 11, an alphabetical character attached to the end of reference code draws a distinction between individual constituting elements of the same kind.

The automated warehouse 700 is an indoor space surrounded by a ceiling 701, a wall 702, and a floor 703. In the automated warehouse 700, racks 710 are installed together with the fixed stations 100 and the gateway 400 described in FIG. 1. Further, although it is not illustrated in FIG. 10 and FIG. 11, the gateway 400 is connected to the calculator 200 via the internet 500.

In FIG. 11, as an example of the mobile object 300, self-propelled carts 320a to 320c that take the packages in and out the racks 710 are illustrated. The height of the rack 710 is about 2 m.

Each of the carts 320a to 320c includes an arm that moves up and down and takes the packages in and out a desired rack 710, and a top panel is provided above the upper limit height of the arm. Sheet-like radio-wave absorption members 303a to 303c are placed on the top panels, and the transmitters 301a to 301c are installed on top surfaces of the radio-wave absorption members 303a to 303c. The top surfaces of the radio-wave absorption members 303a to 303c are examples of the position of the top part of the mobile object 300, where upward radio waves pass through. The radio-wave absorption members 303a to 303c may also be placed on the top panels of the racks 710a to 710c.

The fixed stations 100a to 100c are installed in such positions that the carts 320a to 320c come directly below the fixed stations 100a to 100c when the carts 320a to 320c take the packages in and out the racks 710 and at the positions higher than the heights of the transmitters 301a to 301c by small height margins (for example, about 10 cm). The fixed stations 100a to 100c are attached to lower end portions of insulating spacers 101a to 101c extending from the ceiling 701. The spacers 101a to 101c may be, for example, vinyl chloride tubes.

According to the position estimation system 12 configured as described above, in addition to advantageous effects similar to the position estimation system 11, the following advantageous effects are obtained.

In the position estimation system 12, the radio-wave absorption members 303a to 303c are placed on the top panels of the carts 320a to 320c, and then the transmitters 301a to 301c are installed thereon. By blocking downward radio waves from the transmitters 301a to 301c with the radio-wave absorption members 303a to 303c, multipathing caused by floor reflection is reduced effectively, and the estimation accuracy of the position of the mobile object is improved.

The position estimation systems and the position estimation methods according to some embodiments of the present disclosure have been described above. However, the present disclosure is not limited to respective embodiments.

Embodiments obtained by applying various modifications conceivable to those skilled in the art to the present embodiments and embodiments formed by combining constituting elements of different embodiments may be included in the scope of the one or more aspects of the present disclosure as long as they do not depart from the scope of the present disclosure.

The present disclosure can be widely used, as the position estimation system and the position estimation method, to estimate the position of a mobile object such as a worker, a moving device, or the like.

10, 11, 12 Position estimation system
20 Multihop network
21, 22 Connection
100, 100a-100d Fixed station
101, 101a-101d Spacer
110 Wireless module
120 Antenna
131 Communication circuit
132 CPU
133 RAM
134 ROM
135 Clock circuit
136 Power supply circuit
200 Calculator
300 Mobile object
301a-301c Transmitter
303a-303c Radio-wave absorption member
310a-310c Worker
320a-320c Cart
400 Gateway
500 Internet
600 Work floor
601, 701 Ceiling
602, 702 Wall
603, 703 Floor
604 Doorway
610, 610a, 610b A piece of equipment
620, 710, 710a-710c Rack
700 Automated warehouse

The invention claimed is:

1. A position estimation system comprising:
a plurality of fixed stations installed inside a building, each of the plurality of fixed stations configured to measure a signal strength of a radio signal transmitted from a mobile object; and
a calculator configured to estimate a position of the mobile object based on signal strengths measured at the plurality of fixed stations, wherein
each of the plurality of fixed stations is installed in such a position that a distance from a corresponding fixed station of the plurality of fixed stations to a top part of the mobile object relative to the corresponding fixed station is equal to or less than a predetermined distance when the mobile object is directly below the corresponding fixed station.

2. The position estimation system according to claim 1, wherein
at least one fixed station of the plurality of fixed stations is attached to a ceiling, a wall, a piece of furniture, or a piece of equipment in the building with an insulating spacer interposed therebetween.

3. The position estimation system according to claim 1, wherein
at least one fixed station of the plurality of fixed stations is installed together with a piece of equipment to be used by the mobile object and is installed above a position where the mobile object is located when the mobile object uses the piece of equipment.

4. The position estimation system according to claim 1, wherein
when the signal strength measured by at least one of the plurality of fixed stations is larger than a threshold value, the calculator estimates that the mobile object is directly below that fixed station, and
when the signal strength of none of the plurality of fixed stations is larger than the threshold value, the calculator estimates the position of the mobile object using distances between the plurality of fixed stations and the mobile object, the distances being obtained from the signal strengths respectively measured at the plurality of fixed stations.

5. The position estimation system according to claim 3, wherein
when the signal strength measured by one of the plurality of fixed stations is larger than a threshold value, the calculator estimates that the mobile object is directly below that fixed station, and
when the signal strength of none of the plurality of fixed stations is larger than the threshold value, the calculator estimates the position of the mobile object using distances between the plurality of fixed stations and the mobile object, the distances being obtained from the signal strengths respectively measured at the plurality of fixed stations.

6. The position estimation system according to claim 1, further comprising:
a transmitter configured to transmit the radio signal and installed in the top part of the mobile object at a position where an upward radio wave passes through.

7. The position estimation system according to claim 3, further comprising:
a transmitter configured to transmit the radio signal and installed in the top part of the mobile object at a position where an upward radio wave passes through.

8. The position estimation system according to claim 1, further comprising:
a radio-wave absorption member configured to reduce downward radiation of the radio signal and placed on the mobile object.

9. The position estimation system according to claim 3, further comprising:
a radio-wave absorption member configured to reduce downward radiation of the radio signal and placed on the mobile object.

10. The position estimation system according to claim 1, wherein
the radio signal is transmitted at a plurality of frequencies,
the fixed station measures signal strength of the radio signal at each of the plurality of frequencies, and
the calculator estimates the position of the mobile object using the signal strengths at the plurality of frequencies.

11. The position estimation system according to claim 1, wherein
each of the plurality of fixed stations notifies the calculator of the signal strength using a radio signal of same system as that of the radio signal with which the signal strength is to be measured.

12. The position estimation system according to claim 1, wherein the mobile object is one of a worker or a moving device.

13. The position estimation system according to claim 2, wherein at least one fixed station of the plurality of fixed stations is installed together with a piece of equipment to be used by the mobile object and is installed above a position where the mobile object is located when the mobile object uses the piece of equipment.

14. The position estimation system according to claim 2, wherein
when the signal strength measured by one of the plurality of fixed stations is larger than a threshold value, the calculator estimates that the mobile object is directly below that fixed station, and
when the signal strength of none of the plurality of fixed stations is larger than the threshold value, the calculator estimates the position of the mobile object using distances between the plurality of fixed stations and the mobile object, the distances being obtained from the signal strengths respectively measured at the plurality of fixed stations.

15. The position estimation system according to claim 2, further comprising:
a transmitter configured to transmit the radio signal and installed in the top part of the mobile object at a position where an upward radio wave passes through.

16. The position estimation system according to claim 13, further comprising:
a transmitter configured to transmit the radio signal and installed in the top part of the mobile object at a position where an upward radio wave passes through.

17. The position estimation system according to claim 2, further comprising:
a radio-wave absorption member configured to reduce downward radiation of the radio signal and placed on the mobile object.

18. The position estimation system according to claim 13, further comprising:
a radio-wave absorption member configured to reduce downward radiation of the radio signal and placed on the mobile object.

19. The position estimation system according to claim 2, wherein
the radio signal is transmitted at a plurality of frequencies,
the fixed station measures signal strength of the radio signal at each of the plurality of frequencies, and
the calculator estimates the position of the mobile object using the signal strengths at the plurality of frequencies.

20. A position estimation method comprising:
measuring a signal strength of a radio signal transmitted from a mobile object by a plurality of fixed stations, each of the plurality of fixed stations being installed in such a position that a distance from at least one fixed station of the plurality of fixed stations to a top part of the mobile object relative to the at least one fixed station is equal to or less than a predetermined distance when the mobile object is directly below the corresponding fixed station; and
estimating a position of the mobile object based on the signal strength measured by the at least one fixed station of the plurality of fixed stations.

21. The position estimation method according to claim 20, wherein
when the signal strength measured by the at least one of the plurality of fixed stations is larger than a threshold value, the mobile object is estimated to be directly below that fixed station, and
when the signal strength of none of the plurality of fixed stations is larger than the threshold value, the position of the mobile object is estimated using distances between the plurality of fixed stations and the mobile object, the distances being obtained from the signal strengths measured at the plurality of fixed stations.

* * * * *